United States Patent
Song et al.

(10) Patent No.: US 6,208,692 B1
(45) Date of Patent: Mar. 27, 2001

(54) APPARATUS AND METHOD FOR PERFORMING SCALABLE HIERARCHICAL MOTION ESTIMATION

(75) Inventors: Xudong Song, Princeton; Tihao Chiang, Plainsboro; Ya-Qin Zhang, Cranbury; Ravi Krishnamurthy, Plainsboro, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/106,706

(22) Filed: Jun. 29, 1998

Related U.S. Application Data

(63) Continuation-in-part of application No. 09/002,258, filed on Dec. 31, 1997.

(51) Int. Cl.$^7$ .................................................. H04N 7/18
(52) U.S. Cl. .......................... 375/240.19; 375/240.17; 375/240.18; 375/240.16
(58) Field of Search .................................... 348/398, 397, 348/402, 403, 404, 405, 411, 412, 409, 410, 413, 415, 416, 700; 382/277, 232; 395/200.77; 375/240.17, 240.19

(56) References Cited

U.S. PATENT DOCUMENTS

| | | | |
|---|---|---|---|
| 5,253,058 | * 10/1993 | Gharavi | 348/398 |
| 5,315,670 | 5/1994 | Shapiro | 382/56 |
| 5,337,085 | 8/1994 | Lee et al. | 348/398 |
| 5,412,741 | * 5/1995 | Shapiro | 382/232 |
| 5,659,363 | * 8/1997 | Wilkinson | 348/398 |
| 5,754,793 | * 5/1998 | Eom et al. | 395/200.77 |
| 5,757,668 | * 5/1998 | Zhu | 348/402 |
| 5,909,518 | * 6/1999 | Chui | 382/277 |
| 5,923,376 | * 7/1999 | Pullen et al. | 348/417 |
| 5,973,742 | * 10/1999 | Gardyne et al. | 348/416 |
| 5,982,434 | * 11/1999 | Tong et al. | 348/398 |

FOREIGN PATENT DOCUMENTS 0 785 688   7/1997  (EP) .

OTHER PUBLICATIONS

"Displacement Estimation by Hierarchical Blockmatching", M. Bierling, SPIE vol. 1001 Visual Communications and Image Processing '88, pp. 942–951.

"A Fast Hierarchical Motion–Compensation Scheme for Video Coding Using Block Feature Matching", X. Lee, Y. Zhang, IEEE Trans. on Circuits and Systems for Video Technology, vol.6, No. 6, Dec. 1996, pp. 627–635.

International Search Report.

Xudong Song Et Al: "A Scalable Hierarchical Motion Estimation Algorithm For MPEG–2"; Process of the 1998 IEEE Internat.Symp. On Circuits and Systems,M May 31 –Jun. 3 1998, vol. 4, pp. 126–129, paragraph 2–3, figure 1.

Goh W/B Et Al: "Model–Based Multiresolution Motion Estimation in Noisy Images"; CVGIP Image Understanding, vol. 59, No. 3, May 1, 1994, pp. 307–319, paragraph 4; figure 4.

Mandal M Kr Et Al: "Multiresolution Motion Estimation Techniques for Video Compression"; Optical Engineering, vol. 35, No. 1, Jan. 1, 1996, pp. 128–135.

* cited by examiner

*Primary Examiner*—Andy Rao
(74) *Attorney, Agent, or Firm*—William J. Burke; John V. Silverio

(57) ABSTRACT

An apparatus and a concomitant method for performing hierarchial block-based motion estimation with a high degree of scalability is disclosed. The present invention decomposes each of the image frames within an image sequence into an M-ary pyramid. Different dynamic ranges for representing the pixel values are used for different levels of the M-ary pyramid, thereby generating a plurality of different "P-bit" levels, i.e., a plurality of different M-ary pyramid architectures. The present scalable hierarchical motion estimation provides the flexibility of switching from one M-ary pyramid architecture to another M-ary pyramid architecture according to the available platform resources and/or user's choice.

20 Claims, 7 Drawing Sheets

APPARATUS AND METHOD FOR PERFORMING SCALABLE HIERARCHICAL MOTION ESTIMATION

This is a continuation-in-part of application Ser. No. 09/002,258, filed on Dec. 31, 1997.

The invention relates generally to a system for encoding image sequences and, more particularly, to an apparatus and a concomitant method for performing hierarchical block-based motion estimation with a high degree of scalability.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications which can benefit from efficient video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation/compensation. In brief, the encoder only encodes the differences relative to areas that are shifted with respect to the areas coded. Namely, motion estimation is a process of determining the direction and magnitude of motion (motion vectors) for an area (e.g., a block or macroblock) in the current frame relative to one or more reference frames. Whereas, motion compensation is a process of using the motion vectors to generate a prediction (predicted image) of the current frame. The difference between the current frame and the predicted frame results in a residual signal (error signal), which contains substantially less information than the current frame itself. Thus, a significant saving in coding bits is realized by encoding and transmitting only the residual signal and the corresponding motion vectors.

However, encoder designers must address the dichotomy of attempting to increase the precision of the motion estimation process to minimize the residual signal (i.e., reducing coding bits) or accepting a lower level of precision in the motion estimation process to minimize the computational overhead. Namely, determining the motion vectors from the frame sequence requires intensive searching between frames to determine the motion information. A more intensive search will generate a more precise set of motion vectors at the expense of more computational cycles.

To illustrate, some systems determine motion information using a so-called block based approach. In a simple block based approach, the current frame is divided into a number of blocks of pixels (referred to hereinafter as the "current blocks"). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. However, the determination of motion vectors by this exhaustive search approach is computationally intensive, especially where the search area is particularly large.

Alternatively, other motion estimation methods incorporate the concept of hierarchical motion estimation (HME), where an image is decomposed into a multiresolution framework, i.e., a pyramid. A hierarchical motion vector search is then performed, where the search proceeds from the lowest resolution to the highest resolution of the pyramid. Although HME has been demonstrated to be a fast and effective motion estimation method, the generation of the pyramid still incurs a significant amount of computational cycles.

Furthermore, the above motion estimation methods are not easily scalable. Namely, the architecture of these motion estimation methods do not provide a user or an encoder with the flexibility to scale or switch to a different architecture to account for available computational resources and/or user's choices.

Therefore, there is a need in the art for an apparatus and a concomitant method for a hierarchical block-based motion estimation with a high degree of scalability.

SUMMARY OF THE INVENTION

The present invention is an apparatus and method for performing hierarchical block-based motion estimation with a high degree of scalability. The present scalable hierarchical motion estimation architecture provides the flexibility of switching from one-bit/pixel to eight-bit/pixel representation according to the available platform resources and/or user's choice.

More specifically, the present invention decomposes each of the image frames within an image sequence into an M-ary pyramid, e.g., a four level binary pyramid. Different dynamic ranges for representing the pixel values are used for different levels of the binary pyramid, thereby generating a plurality of different "P-bit" levels.

For example, eight bits are used to represent each pixel value (eight-bit/pixel (P=8)) at the highest level of the M-ary pyramids, whereas one bit is used to represent each pixel value (one-bit/pixel (P=1)) at all other levels of the M-ary pyramids. Scalable hierarchical motion estimation is achieved by changing the dynamic ranges of the levels of the M-ary pyramid, i.e., implementing different combinations of eight-bit pixel layers with one-bit layers (levels) to produce a plurality of M-ary pyramids of varying complexities. Thus, the scalability of the hierarchial motion estimation can be implemented to be responsive to computational complexity, memory requirement and/or communication bandwidth, thereby providing features such as platform-adaptive encoding and computing.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
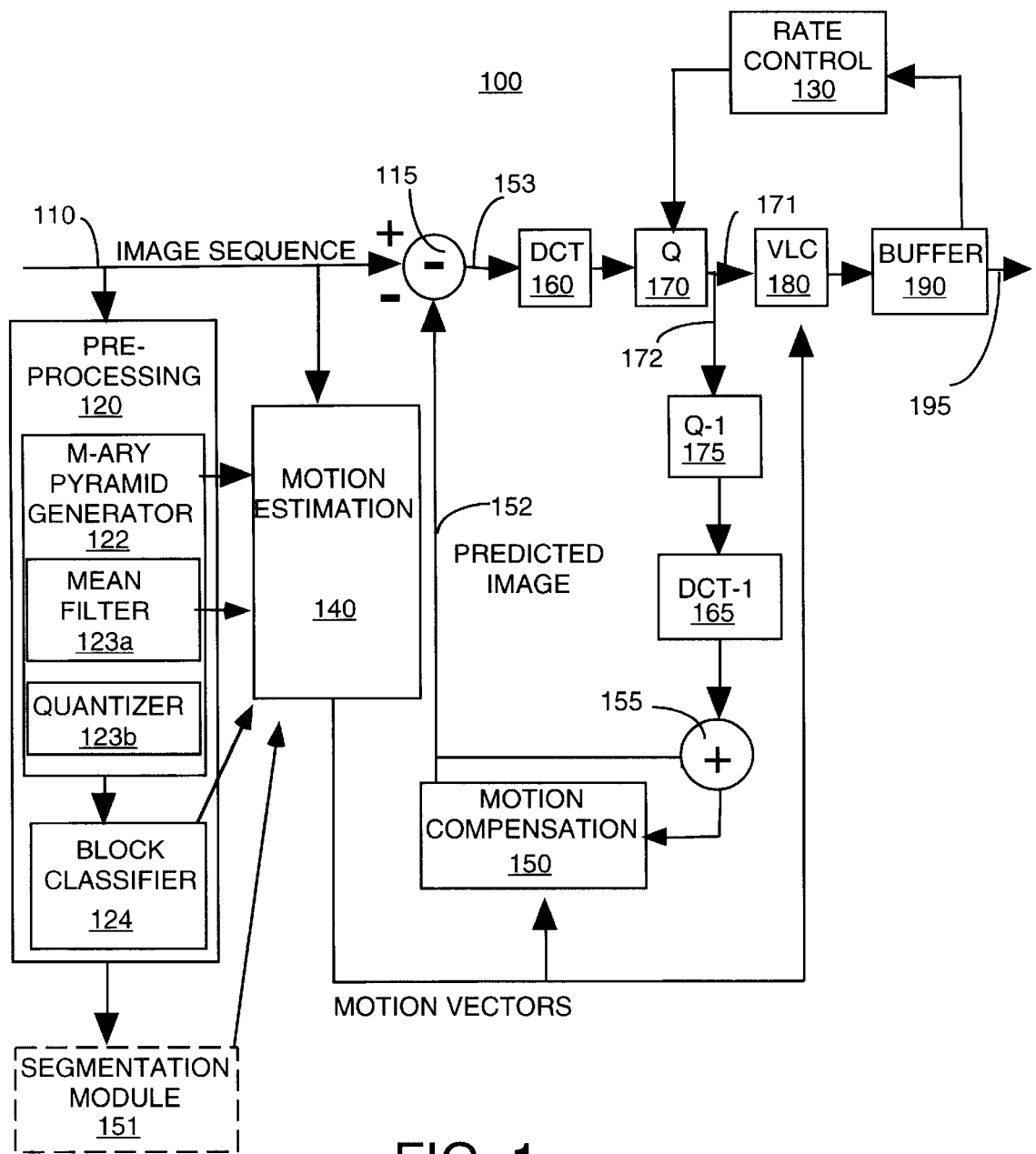
FIG. 1 illustrates a block diagram of the encoder of the present invention.

FIG. 1 depicts a block diagram of the apparatus 100 of the present invention for reducing the computational complexity in determining motion vectors for block-based motion estimation. The preferred embodiment of the present invention is described below using an encoder, but it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*) and MPEG-2 (13818-*), H.261 and H.263.

The apparatus 100 is an encoder or a portion of a more complex block-based motion compensated coding system. The apparatus 100 comprises a motion estimation module 140, a motion compensation module 150, an optional segmentation module 151, a preprocessing module 120, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below).

The following disclosure uses the MPEG standard terminology; however, it should be understood that the term macroblock or block in the present invention is intended to describe a block of pixels of any size or shape that is used for the basis of encoding. Broadly speaking, a "macroblock" could be as small as a single pixel, or as large as an entire video frame.

In the preferred embodiment, the digitized input image signal undergoes one or more preprocessing steps in the preprocessing module 120. More specifically, preprocessing module 120 comprises an M-ary pyramid generator 122 and a block classifier 124. The M-ary pyramid generator 122 employs a mean filter 123a and a quantizer 123b to filter and to quantize each frame into a plurality of different resolutions, i.e., an M-ary pyramid of resolutions, where the different resolutions of each frame are correlated in a hierarchical fashion as described below. In turn, using the pyramid of resolutions, the block classifier 124 is able to quickly classify areas (blocks) as areas of high activity or low activity. A detailed description is provided below for the functions performed by the preprocessing module 120.

The input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In the preferred embodiment, the motion estimation module 140 also receives information from the preprocessing module 120 to enhance the performance of the motion estimation process.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. A rate control method may control the number of coding bits by adjusting the quantization scales.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

Figure 2:
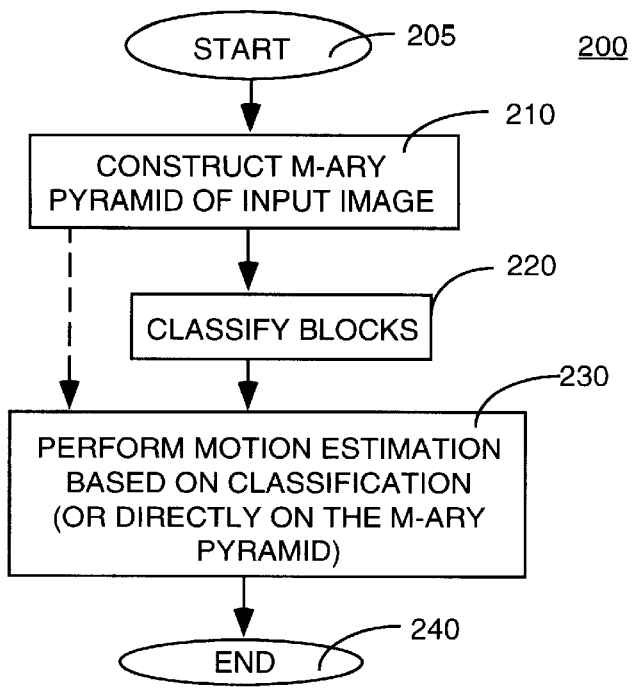
FIG. 2 illustrates a flowchart of a method for reducing the computational complexity in determining motion vectors for block-based motion estimation.

FIG. 2 illustrates a flowchart of a method 200 for reducing the computational complexity in determining motion vectors for block-based motion estimation. Namely, the method 200 enhances a block-based motion estimation method by quickly defining an initial search area where a match will likely occur.

More specifically, method 200 starts in step 205 and proceeds to step 210 where an M-ary pyramid (or M-ary mean pyramid) is generated for each image frame in the image sequence. A detailed description on the method of generating an M-ary pyramid is provided below with reference to FIGS. 3, 4, and 10.

Figure 10:
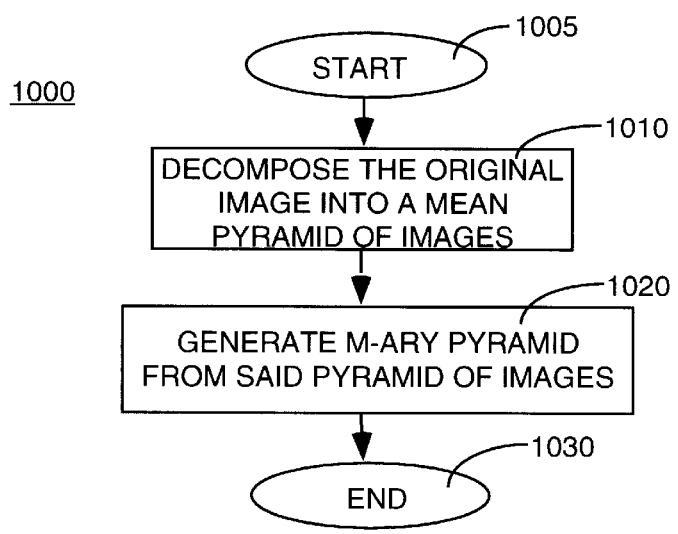
FIG. 10 illustrates a flowchart of a method for generating an M-ary pyramid for an image.

More specifically, FIG. 10 illustrates a flowchart of a method 1000 for generating an M-ary pyramid for an image. The method starts in step 1005 and proceeds to step 1010 where the original image is decomposed into a mean pyramid of images as illustrated in FIG. 3.

Figure 3:
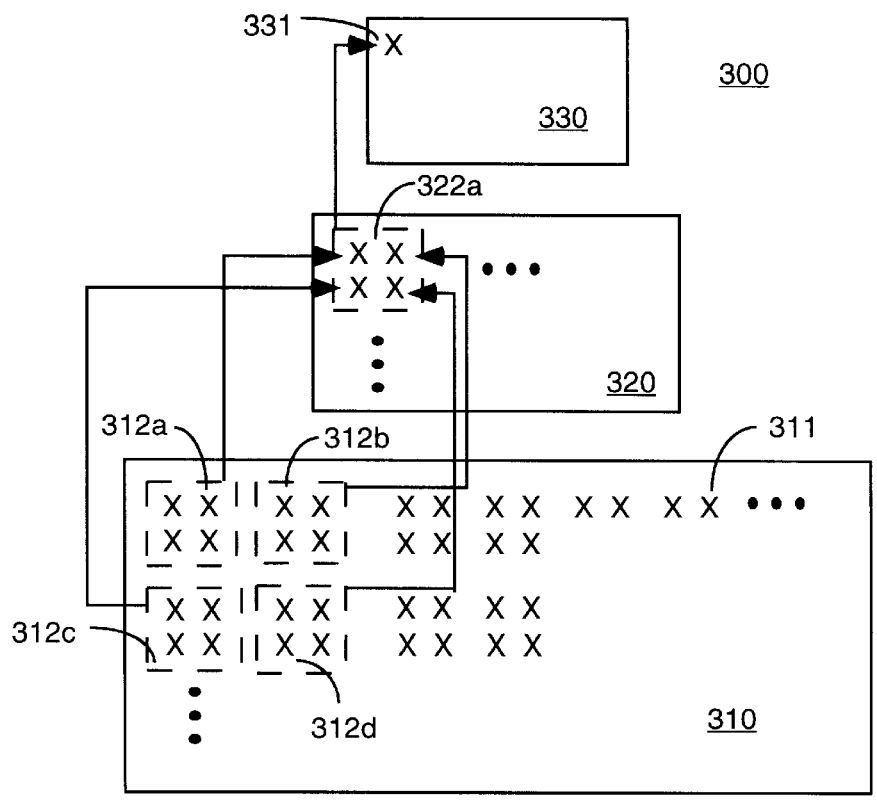
FIG. 3 illustrates a block diagram of a general mean pyramid.

FIG. 3 illustrates a block diagram of a general mean pyramid 300, where the mean pyramid comprises a plurality of levels 310, 320 and 330. The lowest level 310 is an original image frame from the image sequence having a plurality of pixels 311 represented by "x"s. Typically, these pixels are represented by pixel values having a dynamic range that is limited by the number of bits allocated to represent the pixel values. For example, if eight (8) bits are allocated, then a pixel value may take a value from one of 256 possible values.

In a mean pyramid, a next higher level is generated by lowpass filtering and downsampling by a factor of two in both directions, thereby generating a single pixel value (parent) for a higher level from four (4) pixel values (children) in a lower level. This is illustrated in FIG. 3, where each set of four pixels 312a–d is used to generate a single pixel value 321 in level 320. In turn, the set of four pixel values 322a is used to generate a single pixel value 331 in level 330 and so on. It should be understood that the present invention is not limited to a mean pyramid having three levels. The number of levels is generally limited by the size of the image and the downsampling factor selected to generate the next lower resolution image. Thus, the number of levels in the mean pyramid can be selected for a particular application.

In a mean pyramid, the parent pixel value is derived by taking the average of its four children pixel values, thus the term mean pyramid. However, other measure or metric can be used to generate other types of pyramids, e.g., the measure can be based on the median of the four children pixel values. Alternatively, a larger area around the children pixels can be used for a weighted average to obtain a general lowpass pyramid. For the purpose of this invention, each of these different types of pyramids having a set of pyramidal images (e.g., a mean pyramid, a median pyramid, a lowpass pyramid and the like) can be broadly classified as an "image pyramid". From this image pyramid, the M-ary pyramid is generated.

Figure 4:
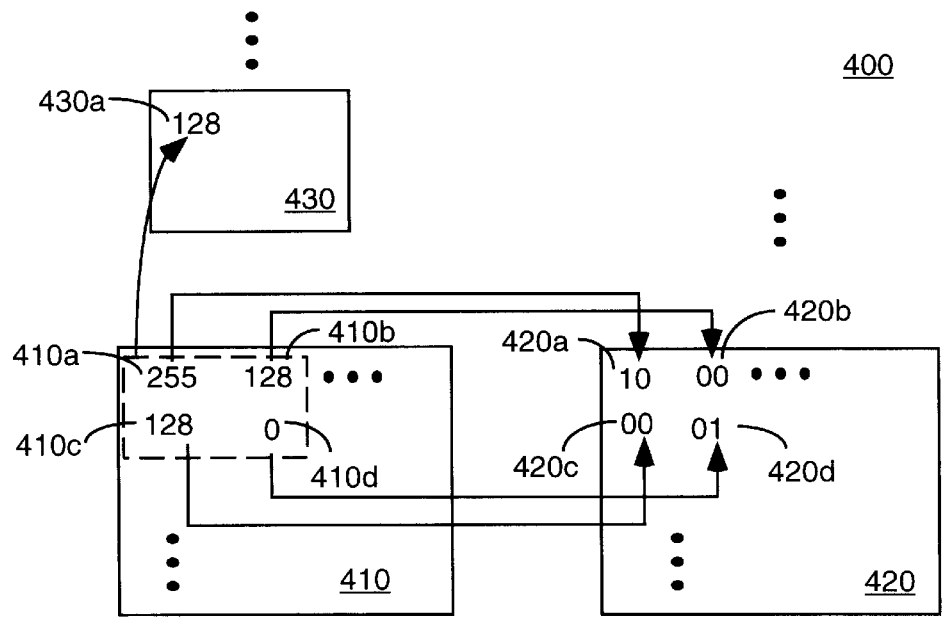
FIG. 4 illustrates a block diagram of the quantization process that generates an M-ary pyramid.

Returning to FIG. 10, method 1000 then generate an M-ary pyramid from said mean pyramid in step 1020. Namely, in an "M-ary pyramid", the pixel values are quantized such that each quantized pixel value can only take "M" possible pixel values as illustrated in FIG. 4 below. For example, if M equals to two (2), then each quantized pixel value, can take on a value of 0 or 1, i.e., resulting in a "binary pyramid".

Thus, different dynamic ranges for representing the pixel values are used for different levels of the binary pyramid, thereby generating a plurality of different "P-bit" levels or layers. Furthermore, a level of the M-ary pyramid having eight bit/pixels is referred to as an 8-bit level (illustrated as an "E" level in FIG. 12), whereas a level of the M-ary pyramid having one bit/pixels (e.g., Boolean) is referred to as an 1-bit level (illustrated as an "O"level in FIG. 12). Thus, the mean pyramid 300 as discussed above comprises a plurality of "E" levels. The distinction and combinatorial use of these "E" and "O" levels are discussed further below.

FIG. 4 illustrates a block diagram of the quantization process that generates a ternary pyramid, where M equals to three (3). More specifically, an eight-bit pixel value 255 (410a) is quantized into a two-bit pixel value 10 (420a) based on the difference between the child and parent pixels. Namely, a difference is computed between a parent 430a and each of its children 410a–d, where each of the four (4) differences is then quantized into three possible values 10, 00, and 01. Thus, pixel value 128 (410b and 410c) is quantized into a pixel value 00 (420b and 420c) and pixel value 0 (410d) is quantized into a pixel value 01 (420d). These representation levels are suitable for the bit wise XOR based cost function that will be used for motion estimation. They are also useful for feature detection and block classification. The M-ary pyramid reduces accuracy of the pixel values, thereby allowing rapid detection of "features" within an image. Features are defined as areas of high activities or intensity, e.g., the edges of an object. It should be noted that the levels 410 and 430 are levels of a mean pyramid, while level 420 is a level of a M-ary pyramid (where M=3). Both of these pyramids may have additional levels as illustrated in FIG. 4, but the M-ary pyramid will have one level less than the mean pyramid. Namely, one needs two mean pyramid levels 410 and 430 to generate a single M-ary pyramid level 420.

Furthermore, the significant reduction in the number of bits used to represent the pixel values translates into a reduction in computational overhead in the motion estimation process. For example, the block matching operation performed in the motion estimation process can be accelerated since there are fewer possible values that a pixel value can take on, thereby simplifying the overall block matching process.

Although M can be any value, it has been found that "lower order" M-ary pyramid, e.g., a binary pyramid decomposition can be more sensitive to noise than a "higher order" M-ary pyramid, e.g., a ternary pyramid. Namely, since the quantized pixel values in a binary pyramid can only take one of two possible values, noise may introduce errors, where a pixel value can be erroneously interpreted as having a value 1 instead of 0 or vice versa. However, a "higher order" M-ary pyramid requires more computational overhead. Thus, although it has been observed that an M-ary pyramid decomposition is best employed when M is greater than 2, the selection of a particular M-ary pyramid decomposition is often dictated by the requirement of the particular application. Once the M-ary pyramid is generated, method 1000 ends in step 1030 and returns to step 220 of FIG. 2.

It should be understood that the important aspect in step 210 is the generation of an M-ary pyramid for each of the input images in the image sequence. As such, although the preferred embodiment generates an M-ary mean pyramid, other types of M-ary pyramids can be employed in the present invention, e.g., an M-ary median pyramid, an M-ary Lowpass pyramid and so on.

Alternately, the inventive concept of a M-ary mean pyramid decomposition can be expressed in equation form. Let (i, j) represent the pixel locations on an image frame and let I(i, j) represent the intensity at location (i, j). Further, let l indicate the level within a pyramid, with $0 \leq l \leq L$, where L is the highest level in the pyramid. Then, the mean pyramids $X^l(i, j), 1 \leq l \leq L$ are constructed as follows:

$$X^l(i, j) = \frac{1}{4} \sum_{m=0}^{1} \sum_{n=0}^{1} X^{l-1}(2i+m, 2j+n) \quad (1)$$

where $X^0(i, j) = I(i, j)$.

Returning to FIG. 2, from these mean pyramids, information such as features within a block can be extracted in step 220 below. In one embodiment, the block is a 8×8 subblock of a macroblock, but it should be understood that the present invention is not limited to this block size. In particular, features like edges can be extracted from the variation of intensities within a block. This variation is represented by calculating the difference between the mean value at a level l, $0 \leq l \leq L-1$ and the mean value at level l+1. However, in order to obtain a robust feature, and in order to facilitate fast motion estimation, these differences are quantized to produce the M-ary pyramid. Each level of the M-ary pyramid will illustrate a pattern over the image that can be used to identify image features like edges and zero-crossings or for implementing motion estimation.

For example, a binary pyramid $B^l(i,j)$ of images can be built as follows:

$$B^l(i, j) = \begin{cases} 0 & \text{if } X^l(i, j) \geq X^{l+1}\left(INT\left(\frac{i}{2}\right), INT\left(\frac{j}{2}\right)\right) \\ 1 & \text{otherwise} \end{cases} \quad (1a)$$

where l indicates a level within the binary pyramid. Although equation (1a) illustrates a particular condition (quantizer step) that defines the two values ("0" and "1") of the binary pyramid, other conditions or quantizer steps can be used to define the two values ("0" and "1") of the binary pyramid in accordance with a particular application.

Alternatively, a ternary pyramid $Y^l(i, j)$ of images can be built. For example, denoting the pattern value in the M-ary (M=3) pyramid by $Y^l(i, j)$:

$$Y^l(i, j) = Quant\left[X^l(i, j) - X^{l+1}\left(INT\left(\frac{i}{2}\right), INT\left(\frac{j}{2}\right)\right)\right], 0 \leq l \leq L-1 \quad (2)$$

Denote the argument of Quant[·] by λ. For example, consider the case of ternary pyramids having a threshold T, and define $Y^l(i, j)$ as follows:

$$Y^l(i, j) = \begin{cases} 00 & |\lambda| < T \\ 01 & \lambda > T \\ 10 & \lambda < -T \end{cases} \quad (3)$$

This definition has the advantage of noise-robustness if the quantization threshold T (e.g., in the preferred embodiment T is selected to 5) is suitably chosen for a particular application. Namely, it is possible to define a "dead zone", e.g., $|\lambda| < T$, where slight variations in the pixel values due to noise can be removed effectively. Thus, any M-ary pyramids (M>2) having a dead zone around zero will minimize the noise sensitivity problem.

In relatively flat areas (areas of low activities), $Y^l(i, j)$ will contain a large number of zeros (0), while in regions containing edges, $Y^l(i, j)$ will contain a number of ones (1). Once the input image is decomposed into an M-ary pyramid, the blocks in the input image can be classified for the purpose of feature extraction using the M-ary pyramid, $Y^l(i, j)$. Namely, the M-ary pyramid can be used to rapidly detect features in the input image without incurring a high computational overhead. The detected features can be used to enhance the motion estimation process as discussed below or other image processing steps, e.g., segmentation of areas (such as objects) within an image, e.g., by using segmentation module 151. Segmentation is an important image processing step, where important areas in the image can be identified to receive special treatment. For example, the face of a person during a video conferencing application may demand special image processing such as receiving a greater allocation of coding bits. Additionally, segmentation can be employed to identify large objects where global motion estimation can be performed on these large objects.

It should be understood that the preceding discussion uses the ternary pyramid as an example and shows one possible method in which the quantization thresholds or levels can be assigned for feature identification and classification. In general, M-ary pyramids with M≧2 can be used with the specific assignment of the quantization thresholds being dependent on the requirement of a particular application and/or the content of the image sequence.

Returning to FIG. 2, after the M-ary pyramid is generated, method 200 proceeds to step 220 where the blocks in the frame are classified in terms of low activity or high activity in view of the M-ary pyramid. In the preferred embodiment, the "classification block size" is a 8×8 block having 64 M-ary pixel values represented by 128 bits. An "activity threshold" of 25 is set where the 8×8 block is classified as a high activity block if 25 or more pixel values are nonzero. Otherwise, the 8×8 block is classified as a low activity block. Additional higher block classification can be performed, e.g., classifying a macroblock as either a high activity or low activity macroblock. In the preferred embodiment, a macroblock comprising at least one subblock that is classified as high activity, causes the macroblock to be classified as high activity as well. It should be understood that the "classification block size" and the "activity threshold" can be adjusted according to a particular application and are not limited to those values selected in the preferred embodiment.

Returning to FIG. 2, after block classification, method 200 proceeds to step 230 where the block classifications are used to enhance the motion estimation process. Generally, motion estimates in areas with significant image features are more reliable than motion estimates in relatively "flat areas" with little changes due to the aperture problem (e.g., uniform areas where the content of the image are very similar for adjacent blocks). Therefore, the classification method described above is used to increase the reliability of motion estimates in general. However, it should be understood that it is not necessary to preclassify a block as to its content prior to the use of the M-ary pyramid in a motion estimation application. Namely, it should be understood that the present invention of an M-ary pyramid can be employed directly (as illustrated by a dashed line in FIG. 2) to enhance the performance of various types or different architectures of motion estimation methods.

More specifically, motion estimation is generally performed on a block by block basis in a raster scan order. The computational overhead or cost is generally evenly distributed over all the blocks during the motion estimation process. In the present invention, motion estimation in the "edge" blocks (high activity blocks) can be performed first using a cost function that depends on $Y^1(i, j)$, and/or $X^1(i, j)$. This approach allows the emphasis of the features in the image and provide robust, reliable motion estimates in the presence of sensor noise, quantization noise, and illumination changes. An example of a cost function could involve a bit-wise XOR operation on the M-ary levels in the pyramid, which can be implemented as a fast method on certain architectures. The cost function is used to determine the "best match". Let us consider an M-ary valued block at time t (current frame), $Y^1(i, j, t)$ and another M-ary valued block at time t-1 (previous frame) $Y^1(m,n,t-1)$. The cost function is then expressed as:

$$\sum_{\text{pixels within the block}} \text{Number of ones in } \{Y^l(i, j \cdot t) \otimes Y^l(m \cdot n, t-1)\} \quad (4)$$

where $\otimes$ represents a bitwise XOR operation. This cost function produces substantial computational savings compared to the standard "absolute difference" cost function used on the original 8-bit pixel intensity values. This procedure is performed hierarchically over the M-ary pyramid.

Figure 5:
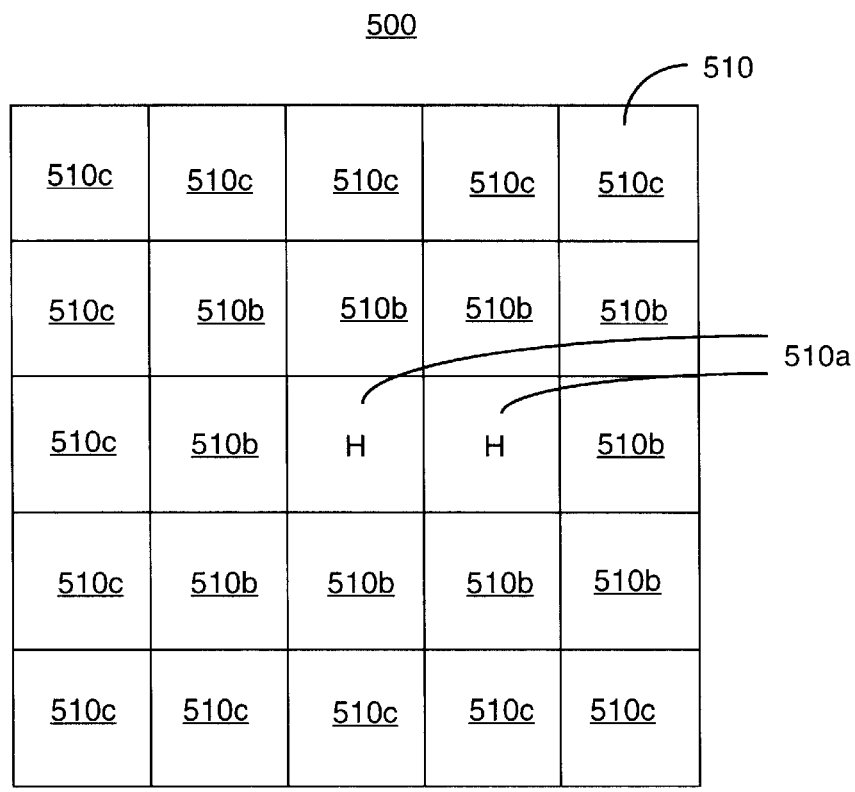
FIG. 5 illustrates an input frame which has been divided and classified into a plurality of blocks.

In other words, the motion estimation method is initiated at the high activity blocks. FIG. 5 illustrates an input frame 500 which has been divided and classified into a plurality of blocks 510. In the preferred embodiment, two blocks 510a have been classified as high activity blocks. As such, motion estimation is performed on these two blocks first. In fact, the computational cost can be increased for these two blocks, since these high activity blocks (high-confidence "edge" blocks), will most likely provide very high accuracy motion vectors. Thus, more intensive motion estimations are performed in these two blocks than other blocks in the image frame 500, e.g., the high activity blocks can be split to obtain more accurate motion vectors, "half pel" motion estimation can be performed in these two blocks or finer search strategies may be employed.

In turn, after motion estimation is completed for the high activity blocks, the motion estimation will then propagate to the low activity blocks ("Low-confidence" blocks) in the image. However, this propagation is done intelligently depending on the region or object segmentation that is obtained from the classification. This propagation is performed by using the motion of the edge blocks as an initialization for the motion of adjacent blocks, and using a relatively small search-range to refine this initialization. Namely, the motion estimation process propagates (e.g., in a spiraling order) to blocks 510b, where the initial search area is derived from the motion vectors of the high activity blocks. In turn, this propagation strategy is then extended to "flat" blocks, e.g., blocks 510c and so on, that do not lie adjacent to an "edge" block, and has the advantage of fast computation since the refinement search-range is relatively small. Furthermore, the motion estimates will be smoother and easier to encode, which is a major advantage in very low bit rate (VLBR) applications where motion information forms a significant portion of the bit-stream. Furthermore, these smoother motion estimates can be expected to perform better in a temporal interpolation application.

Finally, the classification method also produces computational savings when half-pel refinements are used to increase accuracy of motion estimation. The half-pel refinements are performed only on the "edge" blocks, and not on the relatively flat areas of the image.

An alternative embodiment of the present invention involves the use of a plurality of M-ary pyramid architectures or structures (illustrated in FIG. 12) to effect scalable hierarchical motion estimation. For example, in this alternative embodiment, a 4-level binary pyramid is constructed as follows:

$$X^l(i, j) = INT\left\{ \frac{1}{4} \sum_{m=0}^{1} \sum_{n=0}^{1} X^{l-1}(2i + m, 2j + n) \right\} \quad (5)$$

$$1 \leq l \leq 3$$

where $X^1(i, j)$ represents the gray level at the position (i, j) of the lth level and $X_0(i,j)$ denotes the original image.

Secondly, the 4-level binary pyramidal images are built as follows:

$$B^l(i,j) = \begin{cases} 0 & \text{if } X^l(i,j) \geq X^{l+1}\left(INT\left(\frac{i}{2}\right), INT\left(\frac{j}{2}\right)\right) \\ 1 & \text{otherwise} \end{cases} \quad (6)$$

where $0 \leq l \leq 2$ $$B^3(i,j) = X^3(i,j) \quad (7)$$

Figure 12:
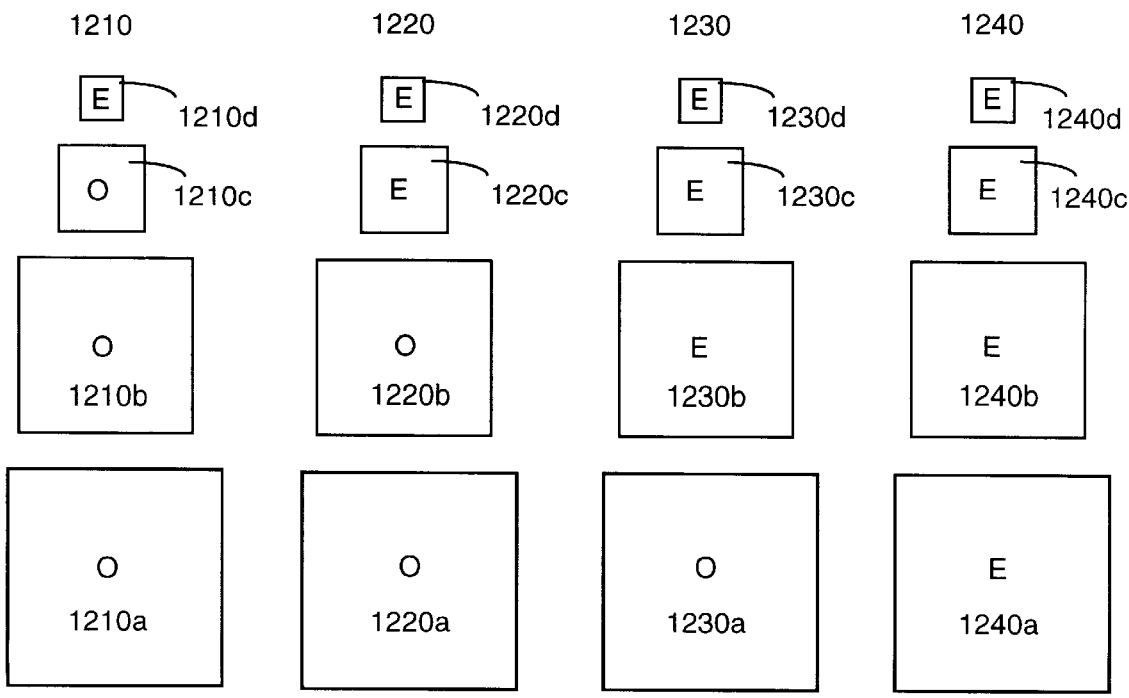
FIG. 12 illustrates a block diagram of a plurality of different M-ary pyramid architectures.

It should be noted that the M-ary pyramid generated by equations (6) and (7) generates a modified binary pyramid having a highest level of the M-ary pyramid represented by equation (7). Namely, the highest level of the M-ary pyramid (e.g., binary pyramid (M=2)) is replaced with the highest level of the mean pyramid. This particular M-ary pyramid architecture 1210 is illustrated in FIG. 12. In the preferred embodiment, a plurality of M-ary pyramid architectures 1210, 1220, 1230 and 1240 are generated to provide a scalable hierarchical motion estimation method.

More specifically, FIG. 12 illustrates four M-ary pyramid architectures of varying complexities. M-ary pyramid architecture 1210 comprises three (3) one-bit levels (O) 1210a–1210c and one (1) eight-bit level (E) 1210d. M-ary pyramid architecture 1220 comprises two (2) one-bit levels (O) 1220a–1220b and two (2) eight-bit levels (E) 1220c–1220d. M-ary pyramid architecture 1230 comprises one (1) one-bit level (O) 1230a and three (3) eight-bit levels (E) 1230b–1230d. M-ary pyramid architecture 1240 comprises four (4) eight-bit levels (E) 1240a–1240d. It should be noted that M-ary pyramid architecture 1240 is simply a mean pyramid.

Figure 7:
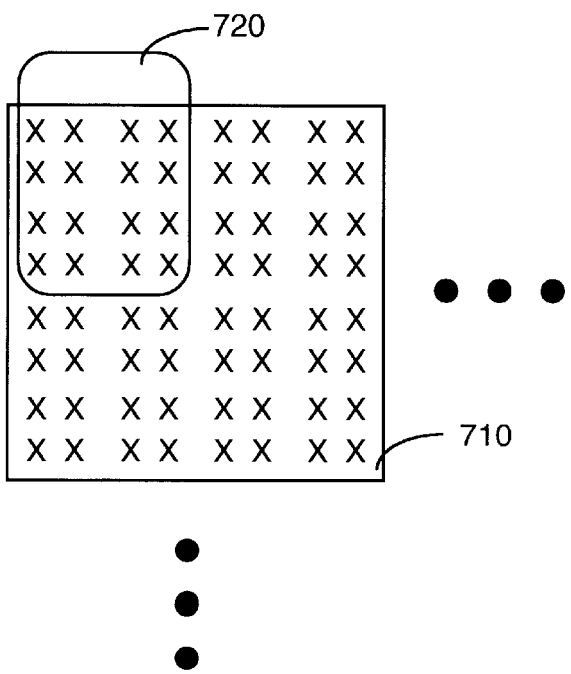
FIG. 7 illustrates a block diagram of a block of pixels with multi-scale tiling.

In operation, for all four M-ary pyramid architectures, motion vectors for level 3 (1210d–1240d) are estimated using full search with "tiling block" sizes of 8×8 (710) and 4×4 (720), i.e., multi-scale tiling as illustrated in FIG. 7. Multi-scale (or N-scale) tiling is the process of performing motion estimation for a current block of the frame using different "tiling block" sizes. For example, if N is set to three, then three (3) motion vectors are generated for each block within each frame, i.e., the block is "tiled" with three different block sizes or scales.

In turn, the motion vectors for level 3 are propagated to level 2 and refined with block sizes of 8×8 and 4×4. The motion vectors from level 2 are propagated to level 1 and refined with block size of 8×8. The motion vectors from level 1 are propagated to level 0 and refined with block size of 16×16. However, the present invention is not limited to a particular number of blocks and block sizes. In fact, any number of blocks and/or block sizes can be implemented with the present invention. For example, N-scale tiling can be implemented in combination with the present invention as disclosed in an accompanying patent application filed simultaneously herewith on Jan. 29, 1998 with the title "Apparatus And Method For Employing M-ary Pyramids With N-Scale Tiling" (Ser. No. 09/106,707), hereby incorporated by reference.

Scalable hierarchical motion estimation is achieved by changing an O level into an E level during the hierarchical motion estimation process. It should be noted that once the M-ary pyramid architecture 1210 is generated, the necessary levels for the other M-ary pyramid architectures 1220–1240 are available. For example, the E level 1220c (level 2 of the M-ary pyramid) is simply the level 2 of a mean pyramid that was previously generated to compute the binary level 1210c. Similarly, the E level 1230b (level 1 of the M-ary pyramid) is simply the level 1 of a mean pyramid that was previously generated to compute the binary level 1210b and so on.

Thus, the entire mean pyramid that was generated to derive the M-ary pyramid 1210 is stored in a location e.g., in the memory of a computer system for later use. In this fashion, four (4) hierarchical motion vector estimation architectures are obtained, which are $HME_{3B}$, $HME_{2B}$, $HME_{1B}$, and $HME_{OB}$ to provide a scalable hierarchical motion estimation process. The labels $HME_{3B}$, $HME_{2B}$, $HME_{1B}$, and $HME_{OB}$ refer to a hierarchical motion estimation with 3 O layers, 2 O layers, 1 O layer, and 0 O layer as shown in FIG. 12.

Figure 11:
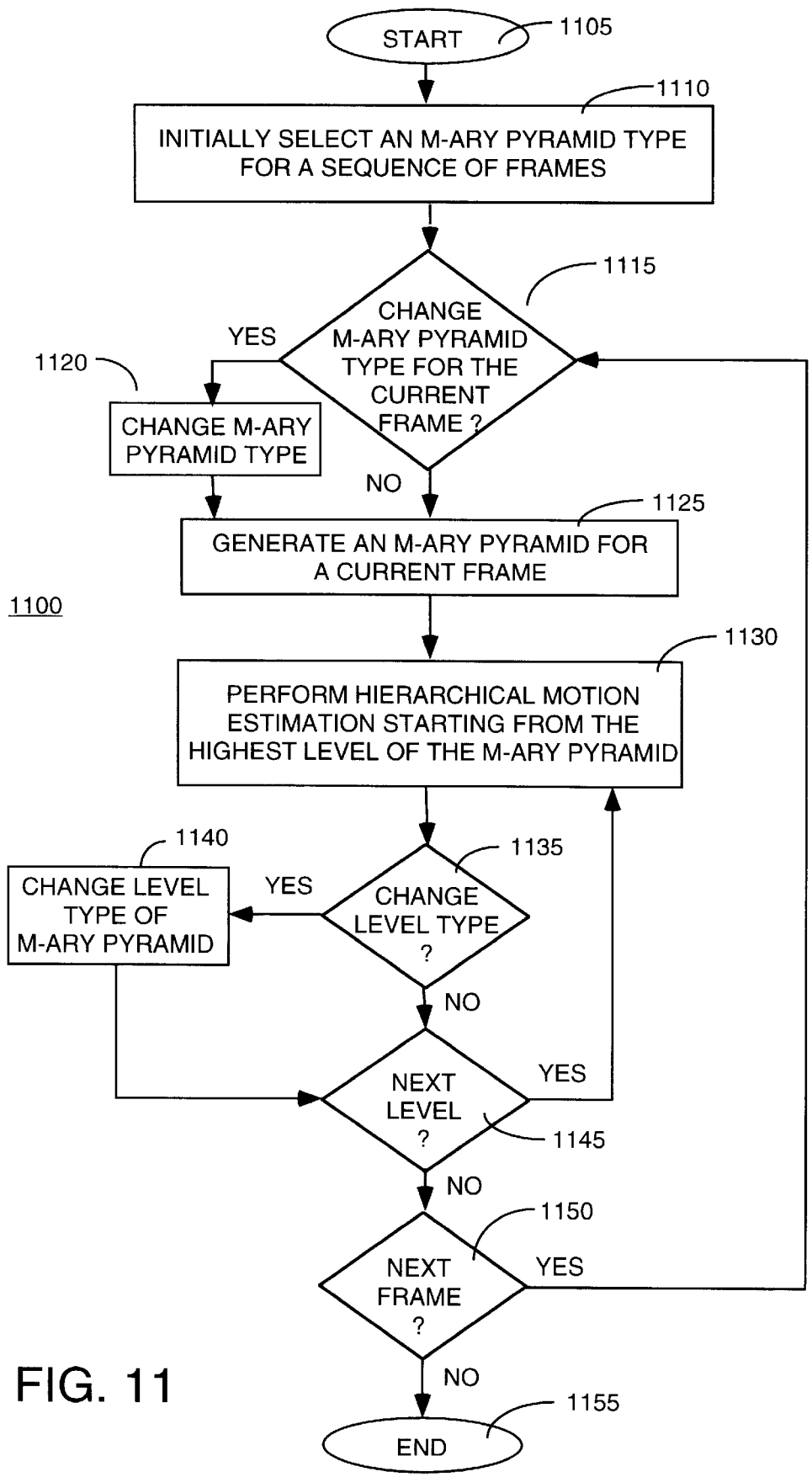
FIG. 11 illustrates a flowchart of a method for performing scalable motion estimation on an M-ary pyramid.

FIG. 11 illustrates a flowchart of a method 1100 for performing a scalable hierarchical motion estimation on an M-ary pyramid. More specifically, method 1100 starts in step 1105 and proceeds to step 1110 where an initial M-ary pyramid architecture (e.g., the binary pyramid (M=2) of equations 6 and 7) is selected for a frame in the image sequence.

In step 1115, method 1100 queries whether the current M-ary pyramid architecture should be changed. The decision to change a particular M-ary pyramid architecture can be based on one or more criteria such as computational complexity, the available memory resources, memory bandwidth, user's choice and/or the available communication bandwidth. If the query is answered negatively, then method 1100 proceeds to step 1125 where an M-ary pyramid is generated in accordance with the selected M-ary pyramid architecture. If the query is answered positively, then method 1100 proceeds to step 1120, where a new M-ary pyramid architecture is selected for the current frame (e.g., changing from architecture 1210 to 1220) and then proceeds to step 1125.

In step 1130, method 1100 performs hierarchical motion estimation starting from the highest level of the M-ary pyramid. Once motion vectors are generated for the highest level, the motion vectors are passed to a lower level of the M-ary pyramid as discussed above.

In step 1135, method 1100 queries whether the current M-ary pyramid architecture should be changed for a next level of the M-ary pyramid architecture. Namely, method 1100 can switch to a different M-ary pyramid architecture during the hierarchical motion estimation process.

Again, the decision to change a particular M-ary pyramid architecture level can be based on different criteria such as computational complexity, the available memory resources, user's choice and/or the available communication bandwidth. If the query is answered negatively, then method 1100 proceeds to step 1145. If the query is answered positively, then method 1100 proceeds to step 1140, where a new M-ary pyramid architecture (or simply a new level, e.g., substituting an O level with an E level) is selected for the current frame and then proceeds to step 1145.

In step 1145, method 1100 queries whether there is a next level for the current M-ary pyramid architecture. If the query is answered negatively, then method 1100 proceeds to step 1150. If the query is answered positively, then method 1100 returns to step 1130, where hierarchical motion estimation is performed on the next level of the M-ary pyramid architecture.

In step 1150, method 1100 queries whether there is a next frame in the image sequence. If the query is answered negatively, then method 1100 ends in step 1155. If the query is answered positively, then method 1100 returns to step 1115, where hierarchical motion estimation is performed for the next frame in the image sequence.

The present hierarchical motion estimation using a binary pyramid with four levels and four different binary pyramid architectures provides a scalable motion estimation method. To illustrate, assume the width and the height of the video image is W and H, respectively. The frame rate of the video sequence is $F_r$. Assume that the size of the image block is N X N. A picture frame contains $$\frac{H}{N}$$

picture slices, and there are $$\frac{W}{N}$$

blocks in each slice. The search window has ±M pixels.

In a block matching motion estimation method, search areas of adjacent blocks may overlap. This overlapped area data can be stored inside an on-chip buffer to reduce external memory bandwidth. Assume a buffer "D" whose size equals to the search area, (N+2M)×(N+2M) bytes. The new loading data size for buffer D is N×(N+2M) bytes when the next block is on the same picture slice. The complete buffer is loaded at the beginning of a slice when processing one picture slice. Thus, the total external memory bandwidth per slice is approximately ((N+2M)²+((W/N)−1)×N×(2M+N)) bytes if boundary block cases are neglected. A derivation of the memory bandwidth requirement for $HME_{3B}$ for a 720× 480 image is given in the following.

The search range at level 3 is set to ±16 pixels. The search range at level 0, level 1, and level 2 is set to ±3 pixels.

At level 3, the memory bandwidth (bytes) is approximated as:

$$MB_3 \approx \frac{60}{4} \times \left((4+32)^2 + \left(\frac{90}{4} - 1\right) \times 4 \times (32+4)\right) + \qquad (8)$$
$$\frac{60}{8} \times \left((8+32)^2 + \left(\frac{90}{8} - 1\right) \times 8 \times (32+8)\right)$$

A level 2, the memory bandwidth (bytes) is approximated as:

$$MB_2 \approx \frac{120}{4} \times \left((4+6)^2\left(\frac{180}{4} - 1\right) \times 4 \times (6+4)\right) + \qquad (9)$$
$$\frac{120}{8} \times \left((8+6)^2 + \left(\frac{180}{8} - 1\right) \times 8 \times (6+8)\right)$$

At level 1, the memory bandwidth (bytes) is approximated as $$MB_1 \approx 2 \times \frac{240}{8} \times \left((8+6)^2 + \left(\frac{360}{8} - 1\right) \times 8 \times (6+8)\right) \qquad (10)$$

At level 0, the memory bandwidth (bytes) is approximated as:

$$MB_0 \approx \frac{480}{16} \times \left((16+6)^2 + \left(\frac{720}{16} - 1\right) \times 16 \times (6+16)\right) \qquad (11)$$

Therefore, the memory bandwidth (bytes/s) of the $HME_{OB}$ is approximated as:

$$MB_{HME_{OB}} \leq F_r \times (MB_0 + MB_1 + MB_2 + MB_3) \qquad (12)$$

The memory bandwidth requirement for the $HME_{1B}$, the $HME_{2B}$, and the $HME_{3B}$ can be derived in the same manner as the above derivation for the $HME_{OB}$. Table 1 lists memory bandwidth requirements in Mbytes/s for the four binary pyramid architectures.

| Binary Pyramid Architecture | Memory Bandwidth |
| --- | --- |
| $HME_{3O}$ | 6.341 |
| $HME_{2O}$ | 8.560 |
| $HME_{1O}$ | 16.630 |
| $HME_{OO}$ | 29.208 |

It can be seen from Table 1 that the memory bandwidth requirement of the present invention is scalable from 6.341 Mbytes/s to 29.208 Mbytes/s as the O layer changes into an E layer.

It should be noted that although the present invention employs a binary pyramid with four levels, the present invention is not so limited. In fact, other M-ary pyramids can be implemented with different levels. Furthermore, the above block classification (high activity and low activity) method can be used to select the levels or the types of the M-ary pyramid architecture to be used. For example, the type of the M-ary pyramid architecture to be selected can be based on the "activities" (high or low) in a particular frame. In fact, any other block classification methods can be used in conjunction with the present invention.

Figure 8:
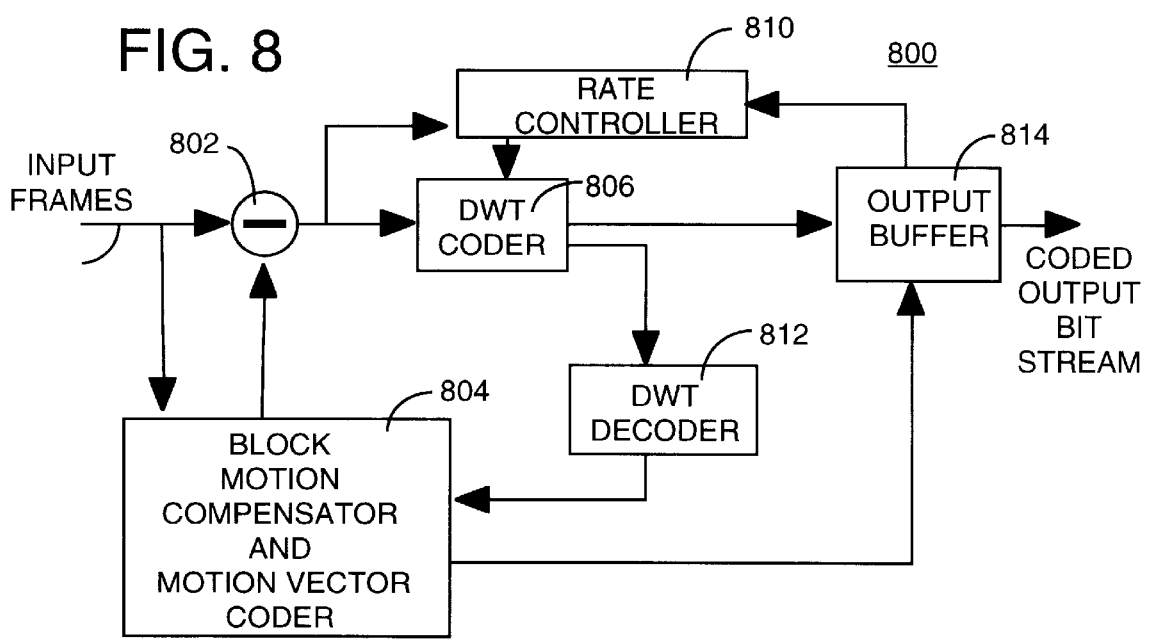
FIG. 8 illustrates a block diagram of a second embodiment of the apparatus of the present invention.

FIG. 8 depicts a wavelet-based encoder 800 that incorporates the present invention. The encoder contains a block motion compensator (BMC) and motion vector coder 804, subtractor 802, discrete wavelet transform (DWT) coder 806, bit rate controller 810, DWT decoder 812 and output buffer 814.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 804, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 9:
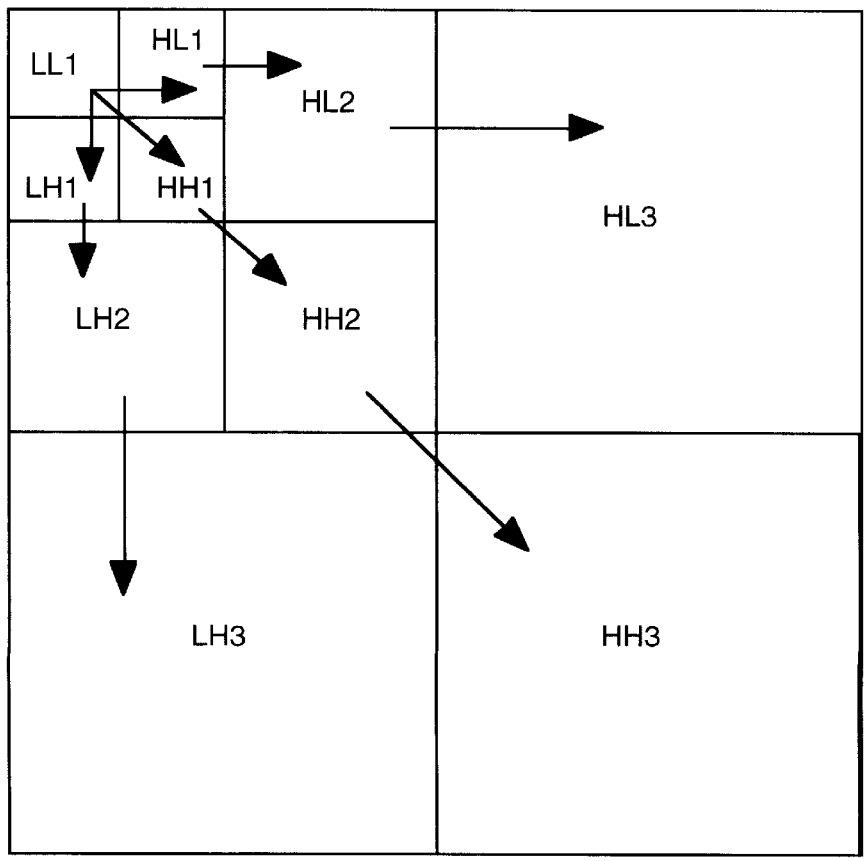
FIG. 9 illustrates a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 9 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 8 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up). The selection of the proper quantization level by the rate controller 810 is as discussed above to control the bit rate for each macroblock within each frame of a sequence. As such, the present invention can be adapted to various types of encoders that use different transforms.

Figure 6:
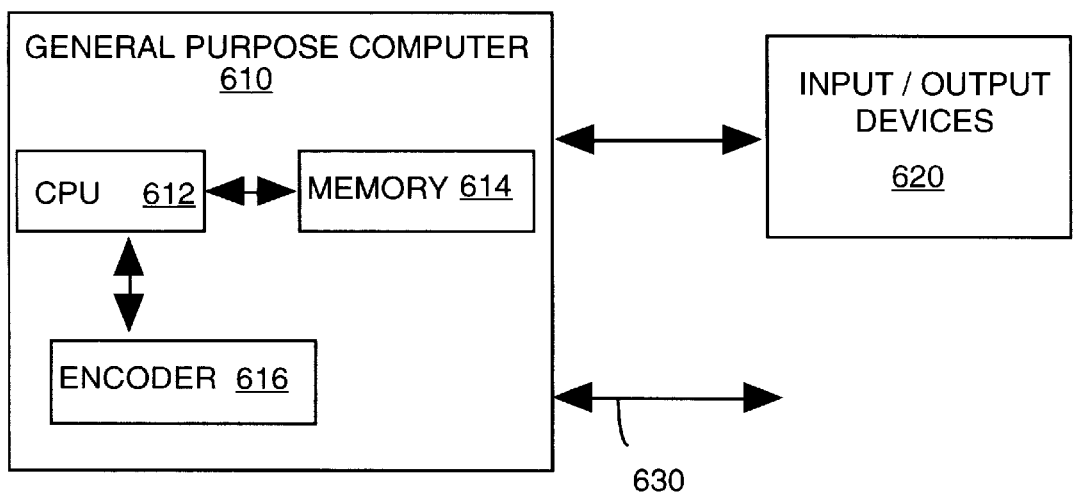
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 and 800 as discussed above. The encoder 616 can be a physical device which is coupled to the CPU 612 through a communication channel. Alternatively, the encoder 616 can be represented by a software application (or a combination of software and hardware, e.g., application specific integrated circuits (ASIC)), which is loaded from a storage device, e.g., a magnetic or optical disk, and resides in the memory 612 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

Although various embodiments which incorporate the teachings of the present invention have been shown and described in detail herein, those skilled in the art can readily devise many other varied embodiments that still incorporate these teachings.

What is claimed is:

1. A method for decomposing an image in an image sequence into an M-ary pyramid, said method comprising the steps of:
   (a) generating an image pyramid having a plurality of levels from the image; and
   (b) generating an M-ary pyramid having a plurality of P-bit levels from said image pyramid, where P for at least two of said P-bit levels of said M-ary pyramid is different.

2. The method of claim 1, wherein said P for at least two of said P-bit levels of said M-ary pyramid is one and eight.

3. The method of claim 1, further comprising the step of:
   (c) performing hierarchical motion estimation on said M-ary pyramid.

4. The method of claim 3, wherein said performing hierarchical motion estimation step (c) comprises the steps of:
   (c1) generating a plurality of motion vectors starting from a highest level of said M-ary pyramid, where said plurality of motion vectors are passed hierarchically to a lower level of said M-ary pyramid;
   (c2) determining at a next level of said M-ary pyramid if it is necessary to change said P to a different value; and
   (c3) changing said P to a different value in accordance with said step (c2) and repeating said steps (c1) and (c2) until a plurality of motion vectors are generated for a lowest level of said M-ary pyramid.

5. The method of claim 4, wherein said determining step (c2) determines whether to change said P in accordance with a memory bandwidth criterion.

6. The method of claim 4, wherein said motion vector generating step (c1) generates a plurality of motion vectors based on a plurality of tiling block sizes.

7. The method of claim 6, wherein said tiling block sizes include a four pixel by four pixel tiling block size and an eight pixel by eight pixel tiling block size.

8. The method of claim 1, further comprising the step:
   (c) selectively changing said P in response to a criterion.

9. The method of claim 1, wherein said image pyramid generating step (a) comprises the step of generating a mean pyramid for the image.

10. A method for performing motion estimation for a sequence of images, where each of said image is divided into at least one block, said method comprising the steps of:
    (a) generating a plurality of M-ary pyramids having different pyramid architectures, where each of said M-ary pyramid architectures comprises a plurality of P-bit levels, where P for at least two of said P-bit levels of at least one of said M-ary pyramid architecture is different;
    (b) selecting one of said M-ary pyramid architectures for performing hierarchical motion estimation; and
    (c) generating a plurality of motion vectors starting from a highest level of said selected M-ary pyramid, where said plurality of motion vectors are passed hierarchically to a lower level of said selected M-ary pyramid.

11. The method of claim 10, wherein said P for at least two of said P-bit levels of said M-ary pyramid is one and eight.

12. The method of claim 10, further comprising the steps of:
    (d) determining for a next image in the image sequence if it is necessary to select a different M-ary pyramid architecture; and
    (e) changing said M-ary pyramid architecture for said next image in the image sequence in accordance with said step (d) and repeating said steps (c) through (e) until motion estimation is performed for the entire image sequence.

13. The method of claim 12, wherein said determining step (d) determines whether to change said M-ary pyramid architecture in accordance with a memory bandwidth criterion.

14. The method of claim 10, wherein said motion vector generating step (c) generates a plurality of motion vectors based on a plurality of tiling block sizes.

15. The method of claim 14, wherein said tiling block sizes include a four pixel by four pixel tiling block size and an eight pixel by eight pixel tiling block size.

16. The method of claim 10, wherein said M-ary pyramid generating step (a) comprises the steps of:
    (a1) generating a mean pyramid for the image; and
    (a2) generating said plurality of M-ary pyramids from said mean pyramid.

17. The method of claim 16, wherein said M-ary pyramid generating step (a2) comprises the step of using at least one level of said mean pyramid as a P-bit level of said M-ary pyramid.

18. An apparatus for decomposing an image in an image sequence into an M-ary pyramid, said apparatus comprises:

an image pyramid generator for generating an image pyramid having a plurality of levels from the image; and an M-ary pyramid generator for generating an M-ary pyramid having a plurality of P-bit levels from said image pyramid, where P for at least two of said P-bit levels of said M-ary pyramid is different.

19. A computer-readable medium having stored thereon a plurality of instructions, the plurality of instructions including instructions which, when executed by a processor, cause the processor to perform the steps of:

(a) generating an image pyramid having a plurality of levels from the image; and (b) generating an M-ary pyramid having a plurality of P-bit levels from said image pyramid, where P for at least two of said P-bit levels of said M-ary pyramid is different.

20. Apparatus for encoding an image sequence having at least one input frame, said apparatus comprising:

a motion compensator for generating a predicted image of a current input frame, said motion compensator comprises an M-ary pyramid generator for generating an M-ary pyramid having a plurality of P-bit levels, where P for at least two of said P-bit levels of said M-ary pyramid is different and a motion estimation module for performing hierarchical motion estimation on said M-ary pyramid;

a transform module for applying a transformation to a difference signal between the input frame and said predicted image, where said transformation produces a plurality of coefficients;

a quantizer for quantizing said plurality of coefficients with at least one quantizer scale to produce a plurality of quantized coefficients; and a coder for coding said quantized coefficients into a bitstream.

* * * * *